United States Patent [19]
Tofte

[11] Patent Number: 5,520,333
[45] Date of Patent: May 28, 1996

[54] TUBE METERING CONTROL SYSTEM

[75] Inventor: S. David Tofte, Mankato, Minn.

[73] Assignee: Micro-Trak Systems, Eagle Lake, Minn.

[21] Appl. No.: 275,584

[22] Filed: Jul. 15, 1994

[51] Int. Cl.$^6$ .................................................. B05B 7/26
[52] U.S. Cl. ........................... 239/10; 239/126; 239/127; 239/155; 239/142; 239/434; 137/625.3; 137/599
[58] Field of Search .................................. 239/172, 148, 239/130, 142, 10, 310, 124, 127, 126, 155, 434; 137/502.1, 625.3, 628.28, 625.4, 599, 602

[56] References Cited

U.S. PATENT DOCUMENTS

| | | | |
|---|---|---|---|
| 3,784,100 | 1/1974 | Kirschmann | 239/11 |
| 4,220,998 | 9/1980 | Kays | 239/172 |
| 4,267,971 | 5/1981 | Johnston | 239/11 |
| 4,433,811 | 2/1984 | Godfrey | 239/74 |
| 4,553,702 | 11/1985 | Coffee et al. | 239/172 X |
| 4,697,773 | 10/1987 | McCracken et al. | 239/172 X |
| 4,710,757 | 12/1987 | Haase | 340/684 |
| 4,723,710 | 2/1988 | Lucore | 239/172 X |
| 4,813,604 | 3/1989 | Curran | 239/172 X |
| 4,854,505 | 8/1989 | LaVine, Jr. | 239/304 |
| 4,942,558 | 7/1990 | Hiniker et al. | 367/91 |
| 4,942,765 | 7/1990 | Hiniker et al. | 73/431 |
| 4,953,790 | 9/1990 | Waldrum | 239/154 |
| 5,014,914 | 5/1991 | Wallenas | 239/172 X |
| 5,260,875 | 11/1993 | Tofte et al. | 364/424.07 |

Primary Examiner—Kevin P. Weldon
Attorney, Agent, or Firm—Schwegman, Lundberg, Woessner & Kluth

[57] ABSTRACT

Method and apparatus for dispensing a liquid agricultural agent at a desired rate. A source of the liquid is pressurized and passed in parallel though at least one regulating capillary tube of such diameter and length as to regulate the rate of dispensing of the liquid at the desired rate. A pressure of the liquid is sensed and controlled for the purpose of adjusting the above-mentioned flow rate. A flow rate of the liquid is sensed and used with the sensed pressure to detect and alert a user of possible problems in the system, such as clogging of a dispensing outlet. A ground speed of the farm tractor which is transporting the system can he sensed in order to calculate the appropriate flow rate. A geographical location a farm machine in order to facilitate "prescription farming". The liquid may be injected and mixed with a carrier, and the mixing can be done in close proximity to an outlet orifice. The pressurized liquid can be fed back to the source of the liquid to agitate the liquid there to prevent settling or stratification.

37 Claims, 7 Drawing Sheets

TUBE METERING CONTROL SYSTEM

FIELD OF THE INVENTION

The present invention relates to systems to control fluid flow and more specifically to systems to monitor and control the flow of liquid agricultural agents at low flow rates.

BACKGROUND OF THE INVENTION

Conventional systems to monitor and control the flow of liquid agricultural agents at low flow rates contemplate a pump, a length of relatively large-diameter tubing to transport the liquid from a reservoir tank to a dispensing location, a sensing and control means, and a nozzle to restrict the flow of the liquid and to provide a controlled rate of application of the liquid.

The typical application for such a system is to dispense the liquid agricultural agents which may include insecticides, herbicides, fungicides, and/or fertilizers to crops. In one typical application, a farm tractor carries a tank of concentrated liquid and is driven across a field of row crops. A boom is attached to the tractor perpendicular to the direction of travel. The boom generally has one or more nozzles which are directed downward and spaced along the boom to dispense the liquid between the rows.

In another typical application, the liquid dispensers are attached to a mower deck in order to save labor by allowing simultaneous mowing and spraying of the liquid agricultural agent.

A nozzle in such a system comprises a relatively small aperture which restricts the flow of the liquid, and is typically located at the terminus of the tubing. The pump in such a system causes the liquid to flow through the tubing, and typically has the capacity to cause much more liquid to be dispensed than is desired. By restricting the flow of the liquid, the nozzle thus provides a means to regulate the amount of liquid dispensed. There is a major drawback in using a nozzle, however, in that a nozzle having a small enough aperture to provide a small flow rate tends to clog, either with particles suspended in the liquid, or with debris from the external environment (e.g., blown dirt and grass clippings from a mower). If a strainer having small enough openings to block particles that would clog the nozzle is used upstream from the nozzle, the strainer tends to clog.

Since the nozzles tend to wear (i.e., where the aperture becomes larger) or partially clog (i.e., where the aperture becomes smaller), it is difficult to maintain accurate dispensing rates at small flow rates. In systems with multiple nozzles, it also tends to be difficult to achieve accurate and equal dispensing rates through each of the several nozzles.

If a nozzle "blows out" or is accidentally knocked off by, for example, a collision with overhanging tree branches, it is difficult to prevent a massive and potentially dangerous "dumping" of the potentially hazardous liquid chemical in one place. The pump in these systems typically has the capacity to rapidly empty the chemical tank. Such accidents can be very expensive to clean up; the soil may even have to be dug up and burned to purge the spilt chemical.

Another method uses a separate metering pump on each dispensing line, however metering pumps are expensive, and generally can provide only open-loop control which tends to be inaccurate.

The term "liquid" as used in this discussion is meant to be inclusive of solutions, emulsions, suspensions and the like.

U.S. Pat. No. 4,433,811 by Godfrey et al. teaches use of a control means which includes a capillary tube taking fluid from a manifold and returning that fluid to a supply tank in an apparatus which controls the rate of application of liquid dyes to a moving textile material.

U.S. Pat. No. 5,260,875 by Tofte et al. and assigned to the assignee of the present invention, which is hereby incorporated by reference, teaches a distributed controller system which uses a half-duplex serial line to communicate between all controllers in a planting and spraying system.

What is needed is a system which can accurately dispense a liquid agricultural agent having possible particles without undue clogging at low flow rates.

SUMMARY OF THE INVENTION

The invention teaches a method and apparatus for dispensing a liquid agricultural agent at a desired rate. A source of said liquid agricultural agent is provided. The liquid is then pressurized and passed in parallel through at least one regulating capillary tube of such diameter and length as to regulate the rate of dispensing of the liquid agricultural agent to the desired rate.

Another aspect of the invention is to sense a pressure of the liquid agricultural agent and to control that pressure for the purpose of adjusting the above mentioned flow rate.

Yet another aspect of the invention is to sense a flow rate of the liquid agricultural agent. Another aspect of the invention is to use the sensed flow rate and the sensed pressure to detect and alert a user of possible problems in the system, such as clogging of a dispensing outlet.

Yet another aspect of the invention is to sense the flow rate in the bulk supply pipe rather than in each capillary dispensing tube.

Yet another aspect of the invention is to sense a ground speed of the farm tractor which is transporting the system in order to calculate the appropriate flow rate to achieve the desired application rate per acre.

Yet another aspect of the invention is to sense a geographical location a farm machine in order to facilitate "prescription farming" wherein chemicals are applied at different rates to different locations in response to particular needs of those locations.

Yet another aspect of the invention is to inject and mix the liquid agricultural agent with a carrier after passing the agent through the regulating capillary tube.

Yet another aspect of the invention is to have the mixing done in close proximity to an outlet orifice.

Yet another aspect of the invention is to feed the pressurized liquid agricultural agent back to the source of the liquid agricultural agent to agitate the liquid there to prevent settling or stratification.

Yet another aspect of the invention is to connect each of the capillary tubes in series with a valve to turn on and off the flow.

Yet another aspect of the invention is to connect at least two of the capillary tubes together to allow the controller to make coarse adjustments in the flow rate by selective opening of some or all of the respective valves on those tubes.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
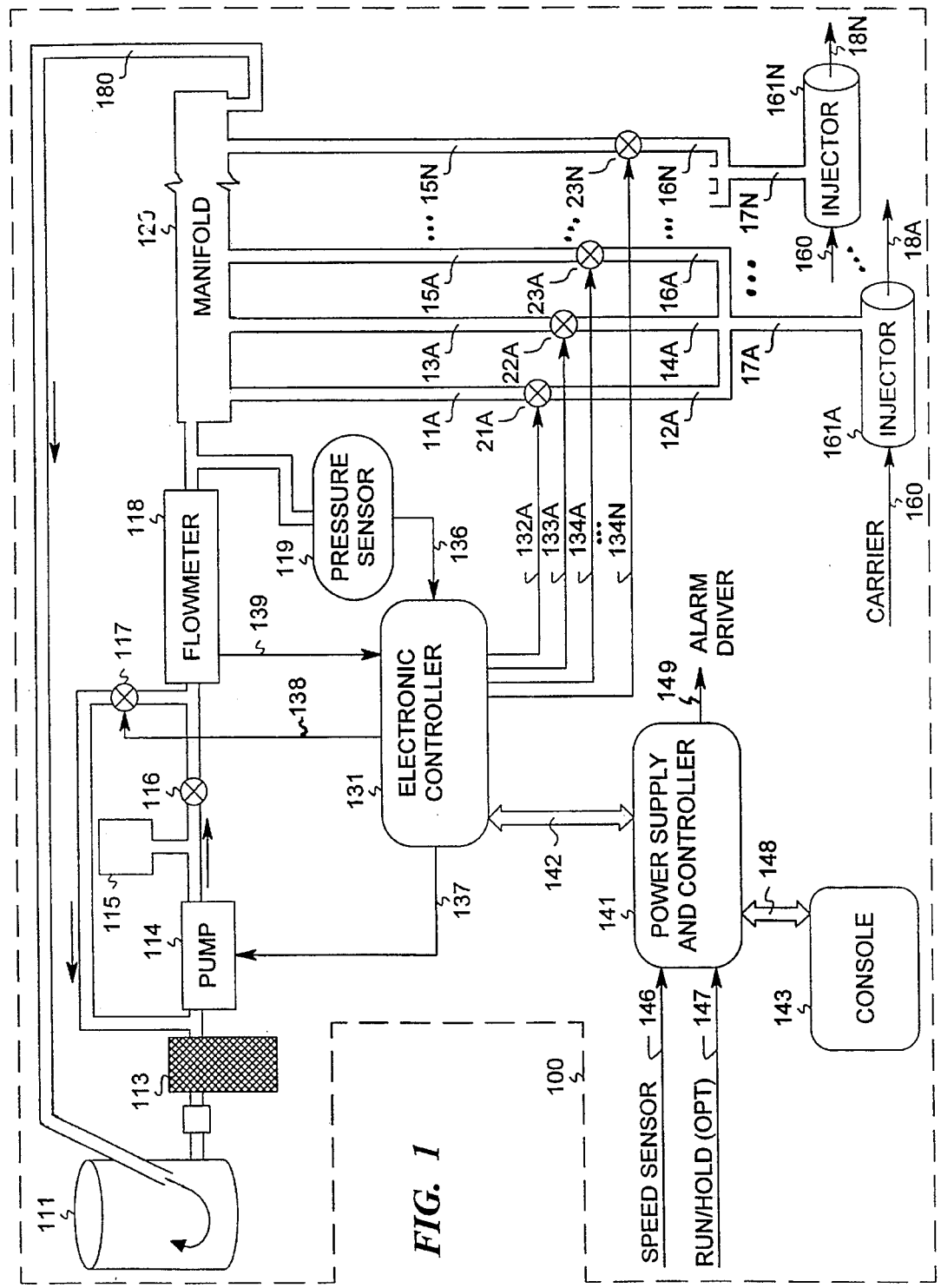
FIG. 1 is a schematic diagram illustrating an embodiment showing many of the features of the invention including a pump, pressure control means, capillary tubes, injectors, and an agitator feedback tube.
Figure 3:
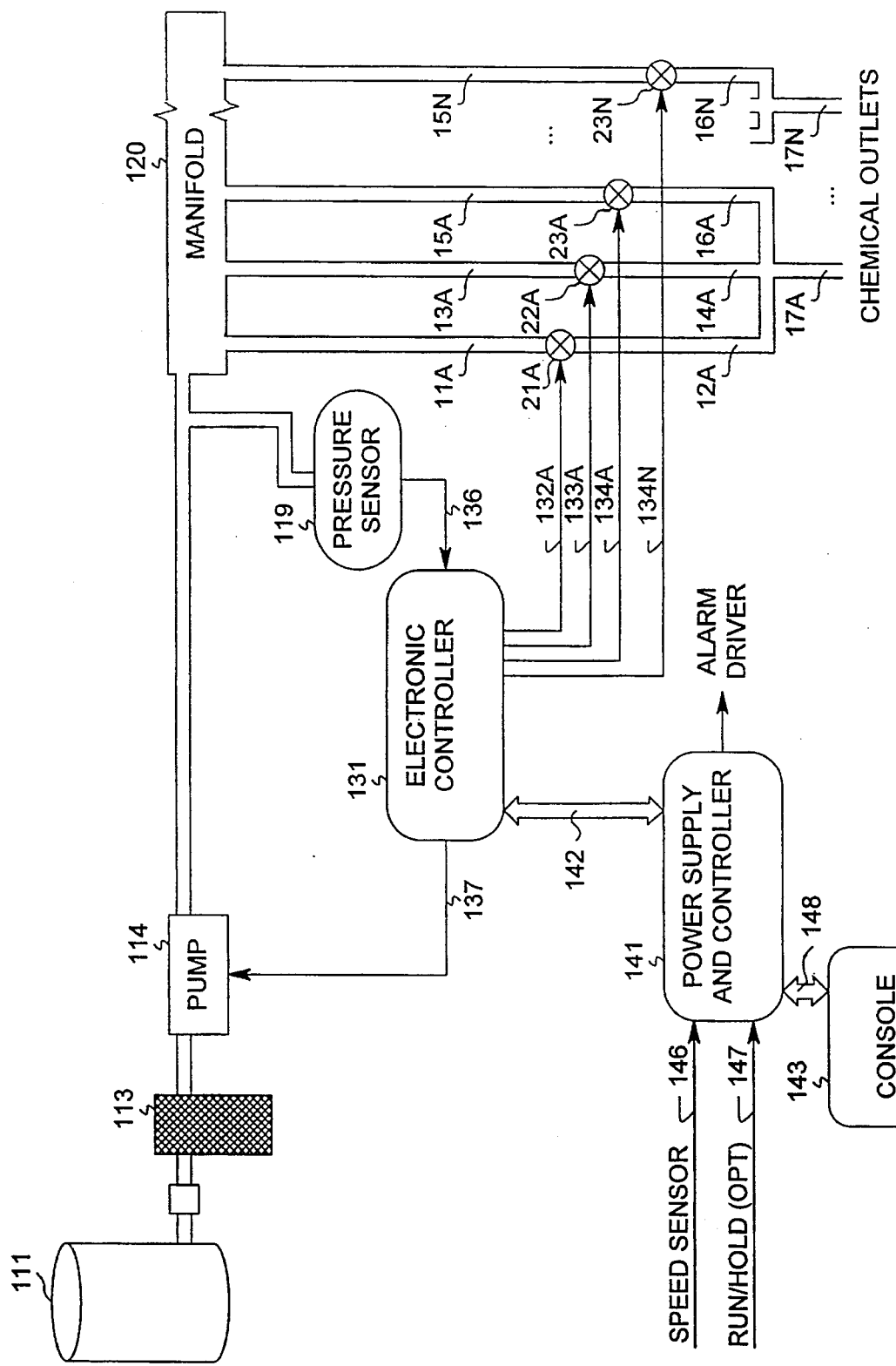
FIG. 3 is a schematic diagram illustrating a simplified embodiment of the invention showing multiple course-adjustment capillary regulating tubes.

FIG. 1 is a schematic diagram illustrating an embodiment showing many of the features of the invention. Chemical supply tank 111 holds the supply of liquid agricultural agent. The liquid passes from supply tank 111 through strainer 113 which blocks passage of particles above a certain size. The mesh size of the screen in strainer 113 is calculated to block particles larger than the largest size of particles which may pass through pump 114, flowmeter 118, or capillary tubes 11A–15N without damaging, jamming, or clogging said components. The screen size of strainer 113 should not be made finer than needed to achieve the above objective, or the strainer itself will clog up with small particles which the other components in the system could have handled without problems.

The liquid from strainer 113 is then pumped by pump 114 to pressurize the liquid to facilitate its transport through the rest of the system. Accumulator 115 and throttle valve 116 then act cooperatively to remove some of the pressure pulsations which may be introduced by pump 114. In one embodiment, accumulator 115 is an air-filled reservoir similar to the "anti-hammer" reservoir used in household water supplies to reduce the "hammering" sound caused when a water valve is quickly closed and the momentum of the moving water in the pipes must be converted to some other form of energy. In one embodiment, throttle valve 116 is a partially-closed manually-set valve which restricts the flow of the liquid from pump 114. Analogies may be made between accumulator 115 and an electrical capacitor, and between throttle valve 116 and an electrical resistor, wherein they together form a low-pass RC filter which removes pressure pulsations introduced by pump 114. In embodiments which use types of pumps which do not have "objectionable" pulsating pressure, accumulator 115 and throttle valve 116 are not needed and may be omitted.

The liquid from throttle valve 116 then passes through flowmeter 118 which provides flow-sense signal 139, indicative of the existence and/or rate of liquid flow, to electronic controller 131. The liquid from flowmeter 118 then passes to manifold 120 which provides the means to distribute the liquid to capillary tubes 11A, 13A, 15A, to 15N. In one embodiment, pressure sensor 119 is coupled to the path of the liquid after it passes through flowmeter 118 to avoid inaccuracies which could be introduced by the pressure drop across flowmeter 118. Pressure sensor 119 provides pressure sense signal 136 to electronic controller 131 indicative of the pressure of the liquid at the entry to capillary tubes 11A to 15N.

Agitator feedback tube 180 takes a portion of the liquid from manifold 120 and feeds the liquid back into chemical source tank 111 to provide agitation and prevent settling or stratification of the liquid mixture. In one embodiment, strainer 113 is located inside agent supply tank 111, and the terminus of agitator feedback tube 180 is located to direct the flow of the feedback liquid across strainer 113 to also provide some cleaning action for strainer 113 to remove particles which otherwise accumulate there.

The liquid from manifold 120 then passes through capillary tubes 11A, 13A, 15A, to 15N. The function of a capillary tube in this invention is to provide a predictable and controllable flow rate of the liquid agricultural agent at low flow rates. The capillary tubes may be made of any suitable material, such as nylon, polypropylene, or stainless steel. For outside environments such as farming, tubing made from plastics should have suitable ultraviolet protection to slow degradation due to sunlight. The flow rate of the liquid in one path is regulated by the length and diameter of capillary tubes 11A and 12A. In contrast, the flow rate in a conventions system is regulated by a nozzle aperture. Since much of the regulation is achieved by the length of the capillary tubing, the inside diameter of the tubing can be made much larger than a corresponding aperture size in a nozzle which is used to achieve a similar low flow rate. To achieve lower flow rates, the length of the capillary tubing is simply increased. This avoids much of the clogging problems encountered when trying to achieve low flow rates using conventional nozzles. Capillary regulation also avoid the problem of nozzles enlarging due to wear, and the problem of chemical dumping if a nozzle is knocked off.

In one embodiment, the length and the inside diameter of capillary tube 11A are set to determine the flow rate, and capillary tube 12A and tube 17A are made as short as possible so that as little liquid as possible remains at the outlet once capillary valve 21A is closed.

FIG. 3 is a schematic diagram illustrating a simplified embodiment of the invention including multiple course-adjustment capillary regulating tubes. Capillary valve 21A is opened and closed by capillary control signal 132A from electronic controller 131; similarly, capillary valve 22A is controlled by capillary control signal 133A, capillary valve 23A is controlled by capillary control signal 134A, and so on, until capillary valve 23N which is controlled by capillary control signal 134N. In one embodiment, shown in FIG. 3 (not to scale), capillary tubes 11A, 13A, and 15A are all made the same length, and the inside diameter of capillary tube 13A is fabricated to provide twice the flow rate as capillary tube 11A at a given pressure in manifold 120, and capillary tube 14A is fabricated to provide four times the flow rate as capillary tube 11A at that given pressure in manifold 120. This embodiment allows a seven-to-one course adjustment in flow rate, as well as "off", to be set by electronic controller 131 by the various possible combinations of open and closed settings for valves 21A, 22A, and 23A.

In the one embodiment shown in FIG. 3, flow meter 118 is combined with pump 114 as a single pumping means shown enclosed by the dashed line in FIG. 3. Through pump control signal 137 and flow sense signal 139, the pumping rate is controlled in order to maintain a pressure in manifold 120 which corresponds to the desired flow rate at outlet tubes 17A–17N, given the lengths and diameters of capillary tubes 11A–15N, and the states (i.e., either open or closed) of capillary control valves 21A–23N.

Referring again to FIG. 1, in one embodiment, electronic controller 131 also performs a fine adjustment of flow rate by partially opening control valve 117, using control valve control signal 138, in response to the desired flow rate and the feedback from pressure sense signal 136 generated by pressure sensor 119. The desired flow rate is determined by a combination of user input through console 143 and a value from speed-sense signal 146. User input through console 143 can include manual or automatic entry of the type of liquid agricultural agent (e.g., the density and viscosity of the liquid), the needs of the crop (e.g., soil type, or density of weeds), or even geographical location via global positioning satellite ("GPS") and infra-red satellite photographical surveys of the crop field showing soil or crop needs.

Although the flow rate is primarily set by controlling the pressure in manifold 120, flowmeter 118 provides an extra check of proper flow. If manifold 120 or the chemical outlets happen to become clogged, electronic controller 131 cannot detect this using pressure sense signal 136 alone, and would maintain a manifold pressure corresponding to the desired flow rate. With input from flow sense signal 139 alone, the controller could not detect undue buildup of manifold pressure due to a partial of complete blockage "down line", and would increase pressure until the desired flow rate was achieved. Using both signals, however, these problems can be detected and the operator can be alerted to correct the problem.

In an alternative embodiment, electronic controller performs a fine adjustment of flow rate by adjusting the pumping rate of pump 114 by setting pump control signal 137 in response to the desired flow rate and feedback from pressure sense signal 136 generated by pressure sensor 119. In embodiments which use types of pumps which can be thus adjusted (e.g., positive-displacement or other "metering" pumps), control valve 117 and control valve control signal 138 are not needed and may be omitted. Using a metering pump for pump 114 allows direct control of liquid flow in the system, and thus flowmeter 118 is also not needed and may be omitted.

In one embodiment, standard modules are used for console 143, power supply and controller 141, and electronic controller 131. Console 143 contains means for receiving input from a user, and means for presenting information to a user.

In one embodiment, console 143 is connected by console-power-and-information bus 148 to power-supply-and-controller 141. In one embodiment, power-supply-and-controller 141 receives environmental input signals such as speed sense signal 146 and run/hold sense signal 147, and alarm driver signal 149. In one embodiment, speed sense signal 146 provides a signal which is proportional to the speed of the associated farm machinery across the field crop. In one embodiment, run/hold sense signal 147 provides an indication of whether the boom is lowered (i.e., in a "run" position for operation) or raised (i.e., in a hold position for stopping or transporting). In one embodiment, alarm driver signal 149 is used to alert the operator of the system that a fault has occurred so that corrective measures may be taken. In one embodiment, power-supply-and-controller 141 receives power from a battery (not shown), and regulates the power and distributes it the other components in the system. In one embodiment, power-supply-and-controller 141 is connected by controller-power-and-information bus 142 to electronic controller 131.

In one embodiment, the liquid from tubes 17A–17N passes to injectors 161A–161N and is dispensed to the field crop. For example, the liquid from tube 17A passes to injector 161A where it mixes with carrier 160, and the mixed result 18A is dispensed to the field crop. Carrier 160 is used to dilute and carry the liquid agricultural agent to the field crop. In one embodiment, carrier 160 comprises water, and the resultant mixture is an emulsion, suspension, or solution, depending on the liquid agent used. In another embodiment, carrier 160 comprises air, and the resultant mixture 18A is an aerosol. In yet another embodiment, carrier 160 comprises air which is already carrying solid particles (e.g., seeds or fertilizer particles) or liquid droplets, and the resultant mixture 18A is an aerosol including the original particles as well as droplets of the injected liquid from tube 17A; this embodiment may be useful for such applications as coating seeds, say, with an insecticide. In one embodiment, the injector mixes the liquid agent with the carrier as close as possible to the nozzle, and tubes 12A, 14A, 16A, and 17A are made as short as possible, to increase the precision with which adjustments may be made to the flow rate, to shorten shutoff times for the liquid agent, and to facilitate quick flushing of the nozzle by carrier 160 once valves 21A, 22A, and 23A have been closed.

Figure 2:
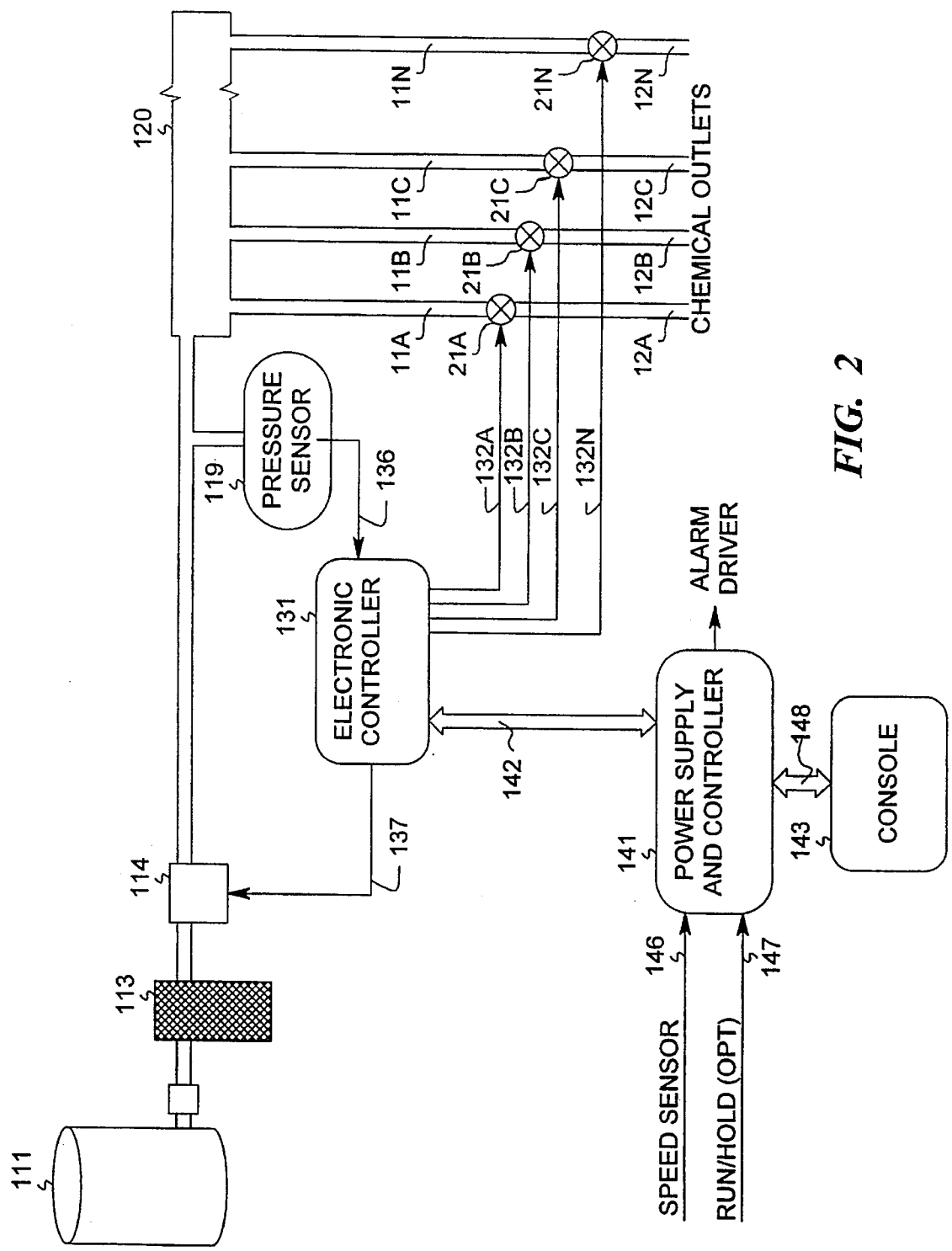
FIG. 2 is a schematic diagram illustrating a simplified embodiment of the invention showing separate capillary regulating and dispensing tubes.

FIG. 2 is a schematic diagram illustrating a simplified embodiment of the invention including separate capillary regulating and dispensing tubes. In this embodiment, the pumping rate of pump 114 is set in response to pressure sense signal 136 and the desired flow rate to achieve a fine adjustment, as described above. Only a single capillary tube is used for each dispensing outlet, so no course adjustment of the flow rate is made. In one embodiment, a boom has one chemical outlet orifice directed downward and spaced along the boom to dispense the liquid between each row; the capillary tubes 11A–11N are each made the same length, thus tubes to orifices at the near end of the boom may be coiled and tubes to orifices at the far end of the boom may be laid straight.

Capillary control signals 132A–132N are used to control capillary valves 21A–21N. In one embodiment, control capillary valves 21A–21N are placed on the boom at the dispensing orifices, and capillary tubes 12A–12N are made negligibly short, in order to reduce the amount of potentially hazardous "undispensed" chemical remaining in tubes 12A–12N.

In another embodiment, capillary valves 21A–21N and capillary control signals 132A–132N are omitted; in this embodiment, shut-off of the source chemical is achieved by turning off the pump, and capillary action keeps the chemical from running out of the outlets of capillary tubes 12A–12N once the pressure is removed from manifold 120.

Figure 4:
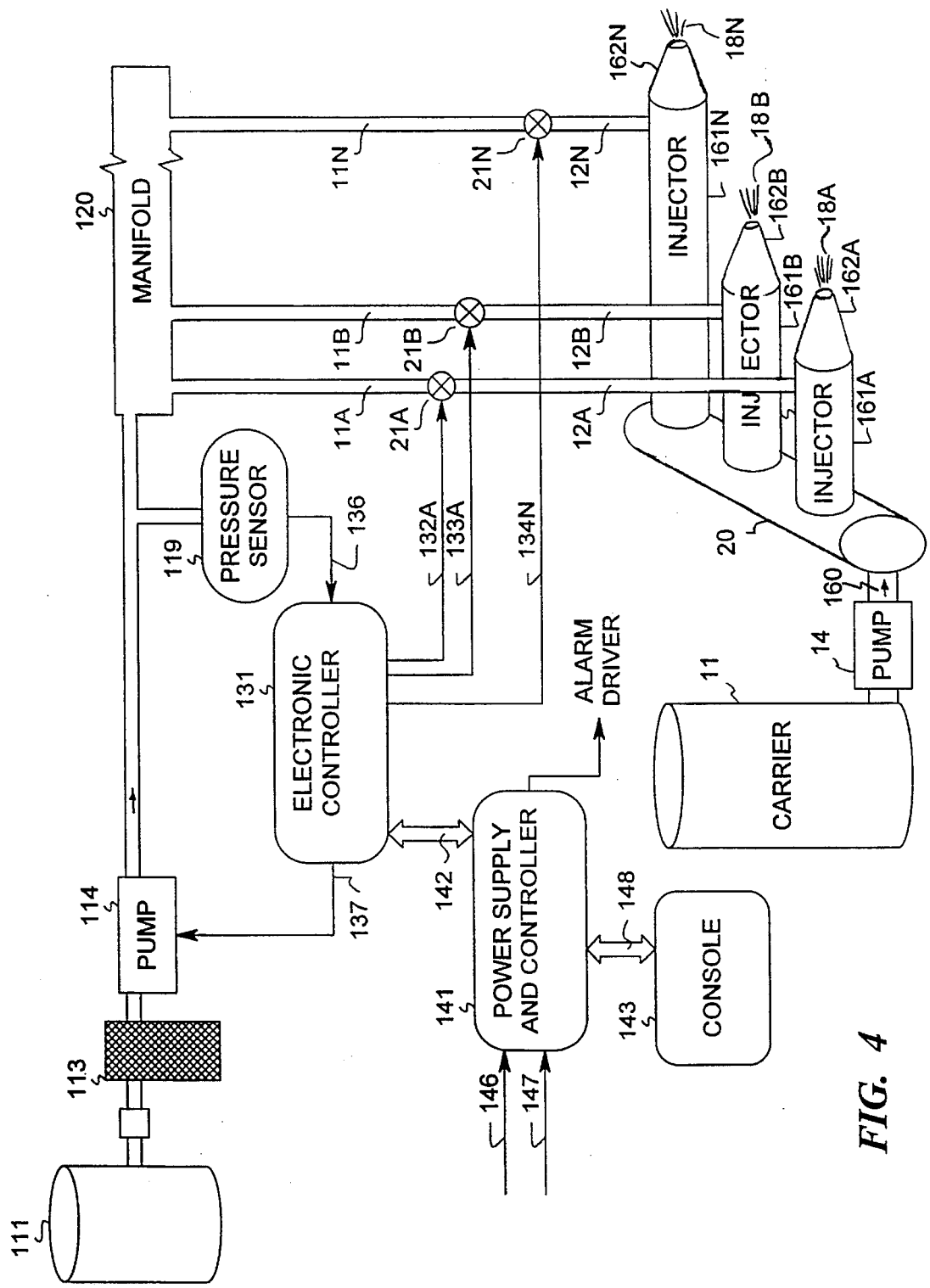
FIG. 4 is a schematic diagram illustrating a simplified embodiment of the invention showing an injection system with mixing at the outlet nozzles.
Figure 5:
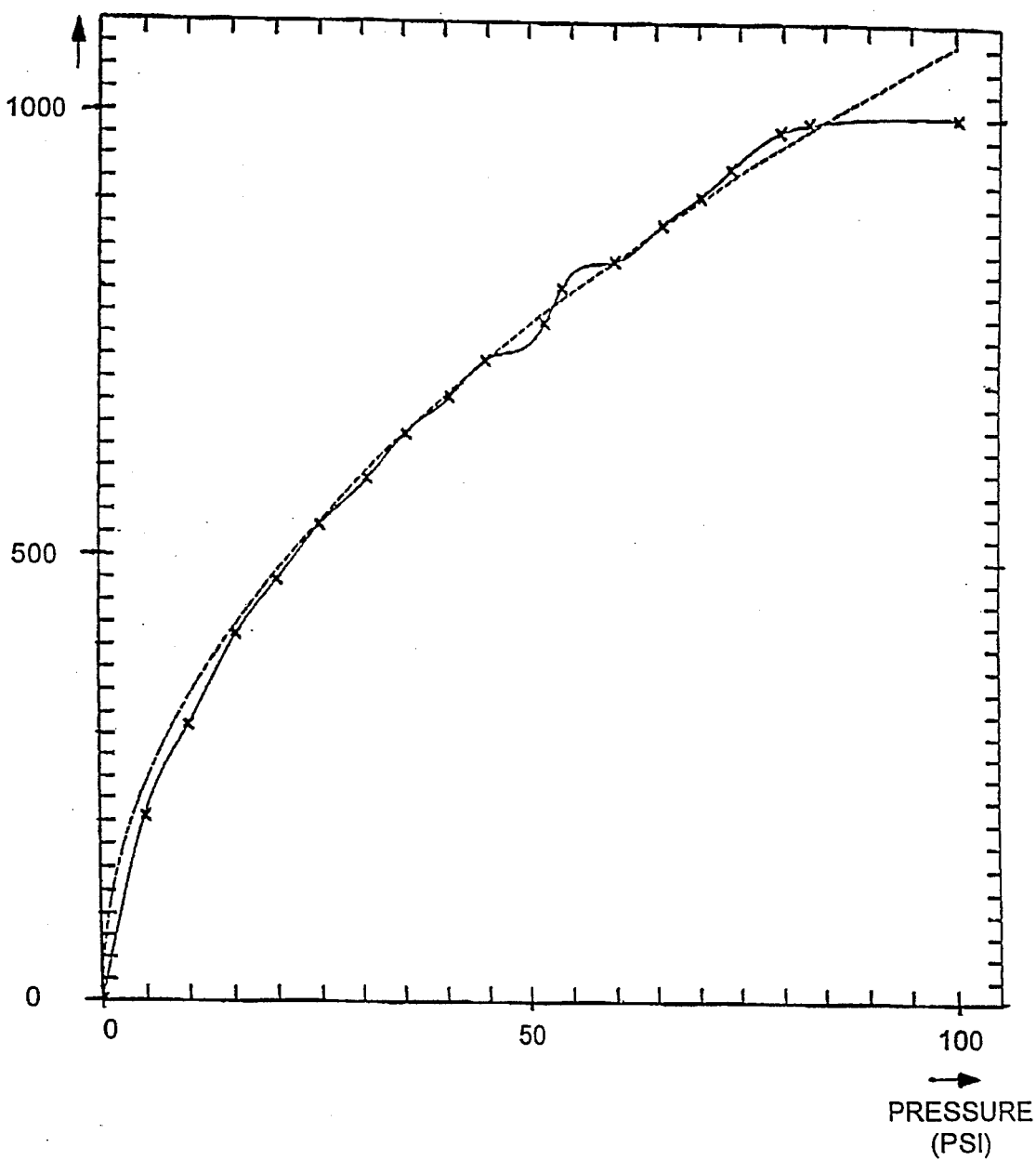
FIG. 5 is a graph of flow rate as measured by a flow meter, and calculated by interpolation, as a function of pressure.
Figure 6:
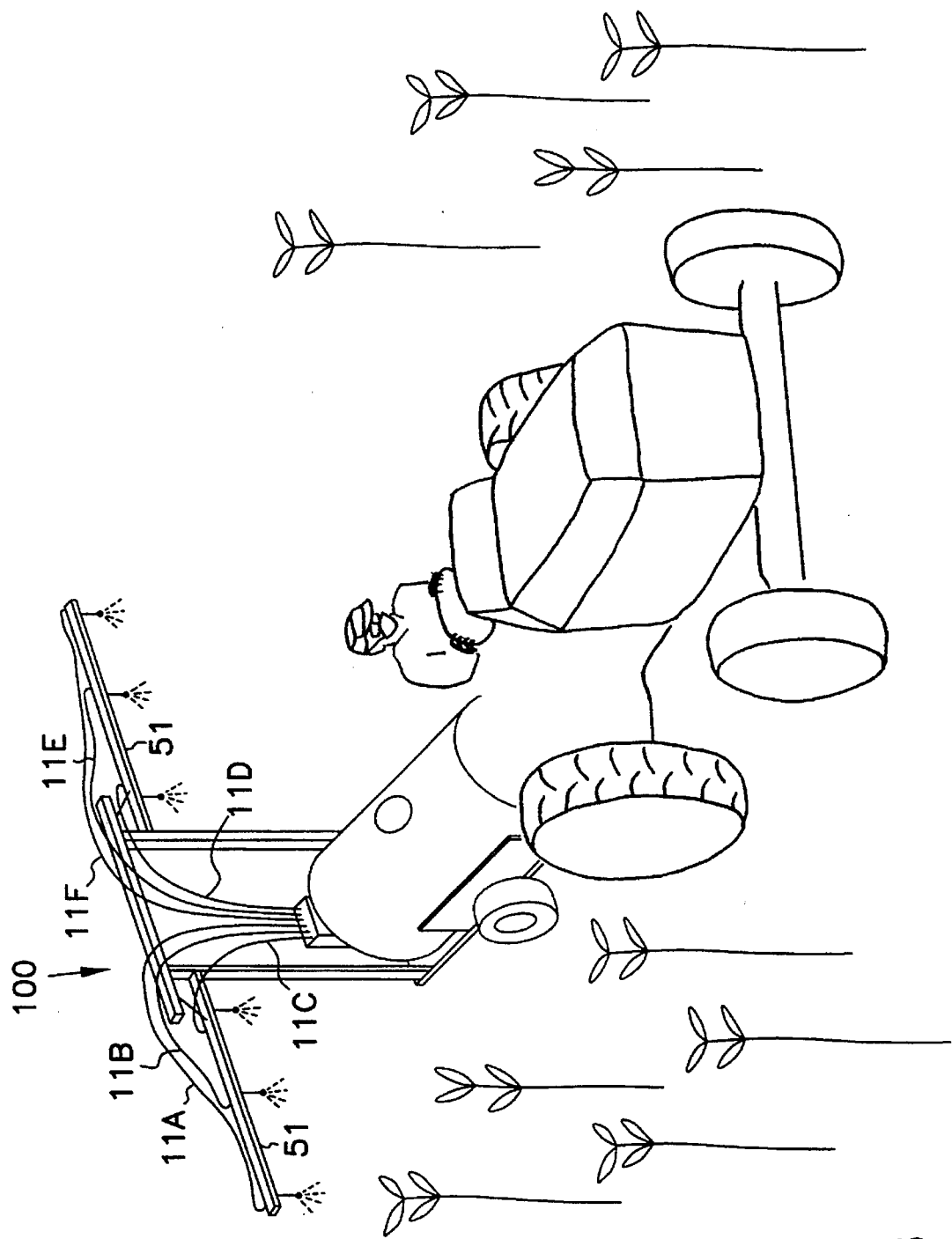
FIG. 6 shows a farm tractor using the invention with a boom dispensing arrangement using two booms.
Figure 7:
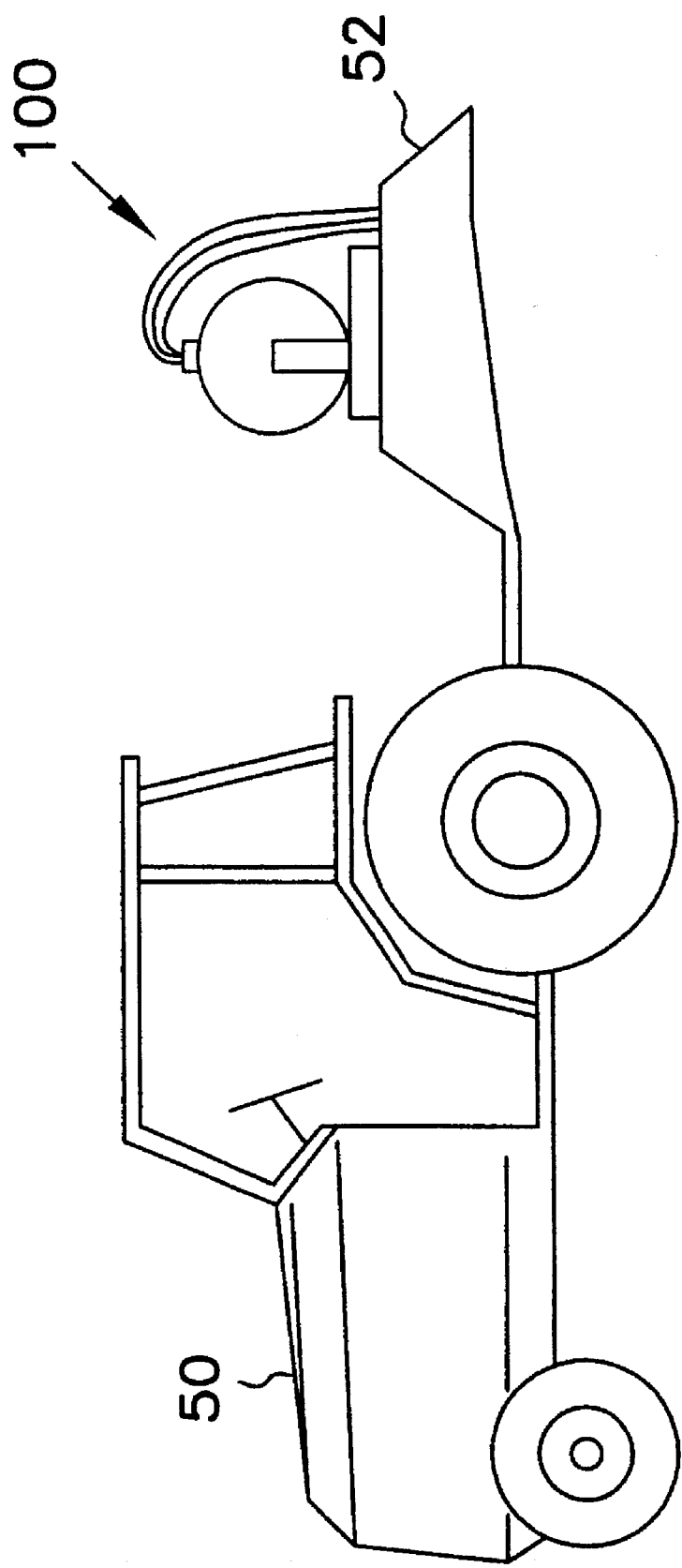
FIG. 7 shows a farm tractor using the invention with a mower.

FIG. 4 is a schematic diagram illustrating a simplified embodiment of the invention showing an injection system with mixing at the outlet nozzles. In one embodiment, the liquid from tubes 12A–12N passes to injectors 161A–161N and is dispensed to the field crop. In this example, carrier supply tank 11 hold a carrier, such as water. Carrier pump 14 pressurizes carrier 160 for transport to injectors 161A–161N. Nozzles 162A–162N can be used in this application since the regulation they perform is of the carrier, which generally has a high flow rate and large aperture nozzles can be used. In this example, the liquid from tube 11A passes to injector 161A where it mixes with carrier 160, and the mixed result 18A is dispensed to the field crop (not shown) through nozzle 162A.

In this embodiment, the injector mixes the liquid agent with the carrier as close as possible to the nozzle, and tubes 12A–12N are made as short as possible, to increase the precision with which adjustments may be made to the flow rate, to shorten shutoff times for the liquid agent, and to facilitate quick flushing of the nozzle by carrier 160 once valves 21A–21N have been closed. An analogy may be made to household shower plumbing: some showers mix the hot and cold water at the valves, and then run the mixture up to the shower head; this arrangement makes for a long lead time between an adjustment of temperature at the valves, and the resultant change in water temperature coming from the shower head scalding the frustrated user. A better arrangement runs separate hot and cold lines from the valves to the shower head, where the hot and cold are mixed just before the nozzle, providing more instantaneous feedback to the user. In the invention, too, there is advantage in providing mixing in close proximity to the nozzle to achieve more accurate dispensing of the liquid agricultural agent.

Calibrating Flow Rates

The flow rate through the capillary tubes can be calculated using equations from any suitable fluid dynamics textbook such as the book by Shearer, Murphy, & Richardson, *Introduction to System Dynamics*, published by Addison Wesley, 1967. One such equation is the "Law of Poiseuille", which characterizes liquid flowing slowly through a long tube of small diameter:

$$\text{Flow Rate}=(\pi\times\text{radius}^4)/(8\times\text{length}\times\text{viscosity})=K_P\times\text{Pressure}$$

This equation shows a high sensitivity to capillary tube inside diameter, a direct relationship to pressure at manifold 120, and a direct inverse relationship of flow rate to capillary tube length.

Another such equation, herein called the "long-pipe equation", characterizes flow rate where the Reynolds number of the liquid is greater than 5000, and the flow is likely to be turbulent.

$$\text{Flow Rate}=K_{LP}\times\text{Pressure}^{(1/1.75)}$$

Here, the constant $K_{LP}$ depends on tube inside diameter, length, wall roughness, and on fluid viscosity and density. At low pressures (in one embodiment using 0.078 inch inside-diameter nylon tubing, these "low" pressures are pressures less than about 20 psi (pounds per square inch)), controller 131 should use the Poiseuille equation, and at higher pressures use the long-pipe equation. The appropriate $K_P$ or $K_{LP}$ can be determined by measuring the flow rate, for a given length and inside diameter of tubing, as a function of pressure.

Another such equation, herein called the "nozzle equation", approximately characterizes flow rate through a nozzle.

$$\text{Pressure}=(\text{density}/(2\times C^2\times\text{area}^2))\times\text{Flow Rate}^2$$

or $$\text{Flow Rate}=K_N\times\text{SquareRoot(Pressure)}$$

Here, the Area is the area of the aperture, C is the discharge coefficient, Density is the fluid density of the liquid.

In one embodiment and associated experiment, flow rates were measured with a flowmeter at 17 various test pressures from 5 to 85 psi, using 0.078 inch tubing, 10 feet in length. (Flow rates were also assumed for 0 psi and 100 psi.) A cubic spline method was used to interpolate a smooth curve and compute 250 entries for a dispensing-factor table which is stored in electronic controller 131. Electronic controller 131 then used a value for ground speed derived from speed sense signal 146, a target rate which is input by a user into console 143, and the above mentioned 250-entry table to calculate a pressure needed to deliver the needed flow rate in order to dispense the desired ounces-per-acre of liquid agricultural agent to the crop. In this embodiment, the formula used is:

$$\text{Flow Rate}=(\text{ground speed}\times\text{target rate})/(\text{dispensing factor}\times 1000)$$

FIG. 5 is a graph of measured (shown by Xs on the graph) and calculated (interpolated solid line) flow rates versus pressure, in psi, for this embodiment. The flow rates are in arbitrary units as provided by flowmeter 118 of FIG. 1. The dashed line represents a nozzle square-root function (nozzle flow=108×square root(pressure)).

FIG. 6 shows a farm tractor 50 using the invention 100 with a boom dispensing arrangement using two booms 51.

FIG. 7 shows a farm tractor using the invention 100 with a mower 52.

It is to be understood that the above description is intended to be illustrative, and not restrictive. Many other embodiments will be apparent to those of skill in the art upon reviewing the above description. For instance, in one embodiment described above, a pump is used to pressurize the liquid agent, but a person skilled in the art could use other analogous methods to the same effect, for instance, an air pump could pressurize supply tank 111 and thus pressurize the liquid agent and cause flow through the system. The scope of the invention should, therefore, be determined with reference to the appended claims, along with the full scope of equivalents to which such claims are entitled.

What is claimed is:

1. A method for dispensing a liquid agricultural agent at a desired rate, said method comprising the steps of:

providing a source of said liquid agricultural agent;

pressurizing said liquid agricultural agent;

passing said pressurized liquid agricultural agent in parallel through at least one capillary tube of such diameter and length as to regulate said desired rate of dispensing of said liquid agricultural agent; and mixing said liquid agricultural agent with a carrier after said passing through said capillary tube step.

2. A method according to claim 1, comprising the further steps of:

sensing a pressure of said liquid agricultural agent; and controlling said pressure.

3. A method according to claim 2, wherein said step of controlling said pressure comprises opening a control valve, said control valve when open allowing said pressurized liquid agricultural agent to flow to said source of said liquid agricultural agent.

4. A method according to claim 2, comprising the further step of sensing a flow of said liquid agricultural agent.

5. A method according to claim 4, comprising the further steps of:

calculating a range of allowed flow rates based on a value of said sensed pressure; and causing a fault to be detected if a value of said sensed flow of said liquid agricultural agent is outside said range of allowed flow rates.

6. A method according to claim 4, wherein said flow sensing step is done before said passing through said capillary tube step.

7. A method according to claim 2, comprising the further step of sensing a speed of travel of a farm machine.

8. A method according to claim 2, comprising the further step of sensing a geographical location of said farm machine.

9. A method according to claim 1, wherein said mixing step occurs in close proximity to an outlet orifice.

10. A method according to claim 1, comprising the further step of feeding said pressurized liquid agricultural agent back to said source of said liquid agricultural agent.

11. A method according to claim 1 wherein each of said capillary tubes is connected in series with a valve.

12. A method for dispensing a liquid agricultural agent at a desired rate, said method comprising the steps of:

providing a source of said liquid agricultural agent;

pressurizing said liquid agricultural agent; and passing said pressurized liquid agricultural agent in parallel through at least one capillary tube of such diameter and length as to regulate said desired rate of dispensing of said liquid agricultural agent;

wherein each of said capillary tubes is connected in series with a valve; and wherein at least two of said capillary tubes connected in series with said valves are thereafter coupled together.

13. An apparatus for dispensing a liquid agricultural agent at a desired rate, said apparatus comprising:

a source of said liquid agricultural agent;

means for pressurizing said liquid agricultural agent and providing a pressurized liquid agricultural agent, said means for pressurizing coupled to said source of said liquid agricultural agent;

means for passing said pressurized liquid agricultural agent in parallel through at least one capillary tube of such diameter and length as to regulate said desired rate of dispensing of said liquid agricultural agent, said means for passing being coupled to said pressurized liquid agricultural agent; and means for mixing said liquid agricultural agent with a carrier after said passing through said capillary tube.

14. An apparatus according to claim 13, further comprising:

means for sensing a pressure of said pressurized liquid agricultural agent, said means for sensing being coupled to said pressurized liquid agricultural agent; and means for controlling said pressure, said means for controlling being coupled to said pressurized liquid agricultural agent.

15. An apparatus according to claim 14, further comprising means for sensing a flow of said liquid agricultural agent.

16. An apparatus according to claim 15, wherein said means for sensing said flow are coupled to and located between said means for pressurizing said liquid agricultural agent and said means for passing through said capillary tube.

17. An apparatus according to claim 14, further comprising means for sensing a speed of travel of a farm machine, said means for sensing said speed coupled to said means for controlling said pressure.

18. An apparatus according to claim 14, further comprising means for sensing a geographical location of said farm machine, said means for sensing said geographical location coupled to said means for controlling said pressure.

19. An apparatus according to claim 13, wherein said mixing means is located in close proximity to an outlet orifice.

20. An apparatus according to claim 13, further comprising means for feeding said pressurized liquid agricultural agent back to said source of said liquid agricultural agent.

21. An apparatus according to claim 13, wherein said capillary tube is connected in series with a valve.

22. An apparatus for dispensing a liquid agricultural agent at a desired rate, said apparatus comprising:

a source of said liquid agricultural agent;

means for pressurizing said liquid agricultural agent and providing a pressurized liquid agricultural agent, said means for pressurizing coupled to said source of said liquid agricultural agent; and means for passing said pressurized liquid agricultural agent in parallel through at least one capillary tube of such diameter and length as to regulate said desired rate of dispensing of said liquid agricultural agent said means for passing being coupled to said pressurized liquid agricultural agent;

wherein said capillary tube is connected in series with a valve; and wherein at least two of said capillary tubes connected in series with said valves are thereafter coupled together.

23. A system for dispensing a liquid agricultural agent at a desired rate, said system comprising:

a source of said liquid agricultural agent;

a pumping means coupled to said source of said liquid agricultural agent and providing a pressurized liquid agricultural agent;

a first capillary tube coupled to said pressurized liquid agricultural agent, said first capillary tube being of such diameter and length as to regulate a flow of said liquid agricultural agent through said first capillary tube to be at said desired rate; and an injector coupled to said first capillary tube, said injector for mixing said liquid agricultural agent with a carrier after said passing said liquid agricultural agent through said first capillary tube.

24. A system according to claim 23 wherein at said pumping means comprises a pump.

25. A system according to claim 24, further comprising:

a pressure sensor coupled to said pressurized liquid agricultural agent, said pressure sensor for sensing a pressure of said pressurized liquid agricultural agent; and a control valve coupled to said pressurized liquid agricultural agent, said control valve for controlling said pressure.

26. An apparatus according to claim 25, wherein said control valve controls said pressure by releasing said pressurized liquid agricultural agent into said source of said liquid agricultural agent if a value of said sensed pressure is above a predetermined value.

27. A system according to claim 24, wherein said pump has a pumping rate which can be controlled, and further comprising:

a pressure sensor coupled to said pressurized liquid agricultural agent, said pressure sensor for sensing a pressure of said pressurized liquid agricultural agent; and a control means coupled to said pump, said control means for controlling said pumping rate of said pump in response to a value of said sensed pressure.

28. A system according to claim 23, wherein said pumping means comprises a pump and a flow meter coupled to an output of said pump, said flow meter for sensing a flow of said pressurized liquid agricultural agent.

29. A system according to claim 23, further comprising a speed sensor for sensing a speed of travel of a farm machine, said speed sensor coupled to said control valve for controlling said pressure in response to a value of said sensed speed.

30. A system according to claim 23, further comprising means for sensing a geographical location of said farm machine, said means for sensing said geographical location coupled to said means for controlling said pressure.

31. A system according to claim 23, wherein said injector is located so that said mixing occurs in close proximity to an outlet orifice.

32. A system according to claim 23, further comprising a feedback tube having two ends, one of said ends coupled to said pressurized liquid agricultural agent and another of said ends coupled to said source of said liquid agricultural agent.

33. A system according to claim 23, further comprising a first valve coupled in series with said first capillary tube.

34. A system for dispensing a liquid agricultural agent at a desired rate, said system comprising:
- a source of said liquid agricultural agent;
- a pumping means coupled to said source of said liquid agricultural agent and providing a pressurized liquid agricultural agent;
- a first capillary tube coupled to said pressurized liquid agricultural agent, said first capillary tube being of such diameter and length as to regulate a flow of said liquid agricultural agent through said first capillary tube to be at said desired rate
- a first valve coupled in series with said first capillary tube
- a second capillary tube; and
- a second valve coupled in series with said second capillary tube, wherein an outlet of said first capillary tube is coupled to an outlet of said second capillary tube.

35. An apparatus according to claim 14, wherein said means for controlling said pressure comprises a control valve, said control valve when open allowing said pressurized liquid agricultural agent to flow to said source of said liquid agricultural agent.

36. An apparatus according to claim 15, further comprising:
- means for calculating a range of allowed flow rates based on a value determined by said means for sensing pressure; and
- means for causing a fault to be detected if a value determined by said means for sensing flow of said liquid agricultural agent is outside said range of allowed flow rates.

37. A system according to claim 25, further comprising:
- a flow sensor coupled to said pressurized liquid agricultural agent, said flow sensor generating a value representative of a flow of said pressurized liquid agricultural agent;
- means for calculating a range of allowed flow rates based on a value determined by said pressure sensor; and
- means for causing a fault to be detected if a value determined by said means for sensing flow of said liquid agricultural agent is outside said range of allowed flow rates.

* * * * *